Oct. 15, 1940.  H. F. J. EDGAR  2,218,421

FISH LURE

Filed Nov. 3, 1939

INVENTOR
Herbert F. J. Edgar
By Ralph Burch
Attorney

Patented Oct. 15, 1940

2,218,421

UNITED STATES PATENT OFFICE 2,218,421

FISH LURE

Herbert Francis Joseph Edgar, Peterborough, Ontario, Canada

Application November 3, 1939, Serial No. 302,769

5 Claims. (Cl. 43—46)

This invention relates to an improvement in a fish lure, and in particular to a lure capable of being used as a floating or sunken bait.

An important object of this invention is to provide a simple method of controlling the flow of water into the chamber within the lure to enable different degrees of buoyancy to be obtained thus controlling the depth of the bait in the water.

Another important object is to construct a transparent bait to create a more perfect illusion when in use.

Still another object of my invention is to construct a durable body of simple construction and using a minimum of parts.

A further object of the invention is to provide an undulating motion when the device is pulled through the water.

A still further object is an alternative construction of hinged segments to provide a wobbling motion of the lure while in forward motion in the water to further create an illusion of a living fish.

These and other objects will appear while the description proceeds. The invention consists in the construction and arrangement of parts more specifically set forth, claimed and shown in the accompanying drawing forming part of this application and in which:

Figure 1:
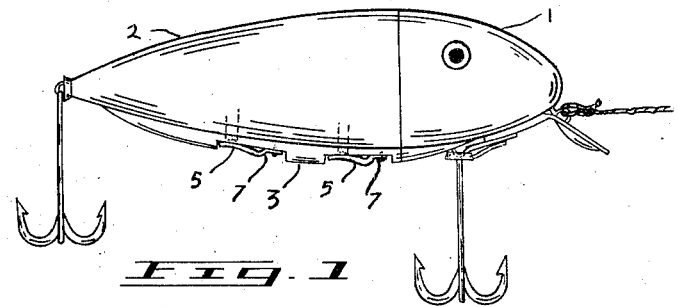
Fig. 1 is an elevational view of my fish lure in pictorial representation.
Figure 2:
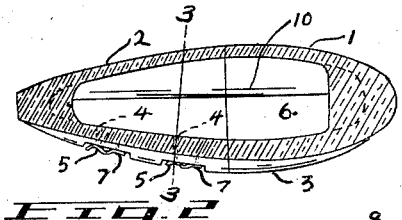
Fig. 2 is an elevation and sectional view of the device.
Figure 3:
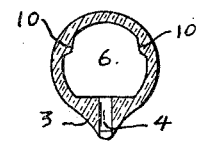
Fig. 3 is a sectional view of the device along the line 3—3 of Figure 2, showing the opening to the chamber within the lure.

Referring more in detail to the drawing in which similar reference characters designate corresponding parts, it will be seen that my invention comprises a fishing lure made of Tenite or some other clear material. The chambered body is made of two separate parts 1 and 2 with open ends provided with a meeting surface disposed in a plan transverse to the bait axis. The body of the device is formed with a rib 3 on its bottom and outer surface for the dual purpose of strengthening the lure and providing a base for the buoyancy control passage 4 and valve mechanism 5.

Figure 7:
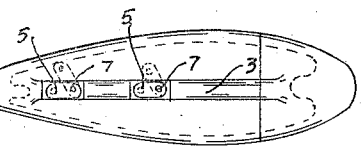
Fig. 7 is a bottom plan view of the lure showing the rib and control valves for the air lock.
Figure 8:
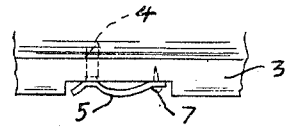
Fig. 8 is a fragmentary view of the rib showing a control valve in detail.
Figure 9:
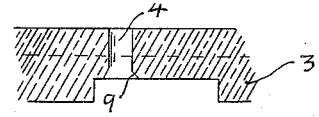
Fig. 9 is a fragmentary sectional view of the rib showing the air and water passage and valve device unattached.
Figure 10:
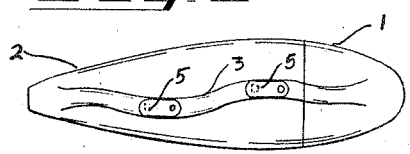
Fig. 10 is a bottom plan view of an alternative rib design.

The said rib 3 may extend straight along the longitudinal bottom of the device as in Fig. 7, or may be of wave-like shape as shown in Fig. 10 to provide an undulating movement of the lure when the same is in forward motion in the water.

The said valve is composed of a metal spring of a particular design to fit securely into the control passage on the valve seat 9 thereby regulating the amount of water in the chamber 6 of the device. This valve swings into and out of position by pivoting about the screw 7.

Figure 4:
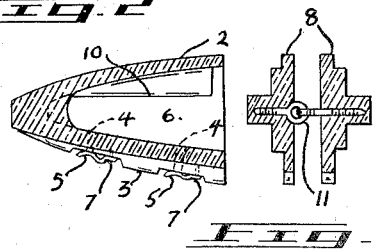
Fig. 4 is an elevation and sectional view of an alternative construction for a wobbling device.
Figure 5:
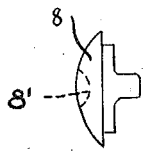
Fig. 5 is an elevational view of the hinge cap.
Figure 6:
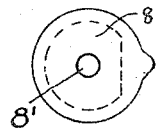
Fig. 6 is a plan view of the hinge cap.

The caps 8 are air tight plates attached to the meeting surfaces of each section of the lure to provide an alternative design but keeping to the particular purpose and spirit of the invention in all other respects. The said caps are connected to each other by screw eyes 11 which makes a jointed connection of the sections permitting the lure to flex in a lateral movement when in motion through the water. The meeting faces of the caps 8 are shown flat in Fig. 4 but may be convex shape as shown in Fig. 5, the center of the convex faces being provided with recesses 8' to receive the screw eyes. The reinforcing ribs 10 on the inner surface of the body run in a longitudinal position for the purpose of strengthening the lure.

It is believed that this description in conjunction with the attached drawing will describe fully the construction and objects of my invention, but it is understood that in practice such deviations from such detail may be resorted to as do not form a departure from the spirit of the invention as defined by the appended claims.

I claim:

1. A fish lure comprising a chambered body, an exterior rib on the underside of said body extending longitudinally thereof, said rib having passages therethrough opening into the chamber of said body, and valve means mounted on said rib for controlling the flow of water through said passages.

2. A fish lure comprising a chambered body composed of two sections having caps sealing their open ends, means hingedly connecting said sections in longitudinal alinement, a rib on the underside of said body and extending longitudinally thereof having passages therethrough to permit water to pass into the chamber of said body, and valve means on said rib for controlling the flow of water through said passages.

3. A fish lure comprising a chambered body, a rib on the underside of said body and extending longitudinally thereof, said rib having passages therethrough to permit water to flow into said body, and spring valve plates pivotally mounted on said rib adapted to normally close said passages.

4. A fish lure comprising a chambered body constructed of transparent material, said body having internal reinforcing ribs and an external longitudinal rib on its underside, said external rib having passages therethrough to permit water to enter said body, and valve plates mounted on said external rib adapted to normally close said passages.

5. A fish lure comprising a chambered body having an undulating longitudinal rib formed on its underside, said rib having passages therethrough to permit water to enter said body, and valve plates mounted on said rib adapted to normally close said passages.

HERBERT FRANCIS JOSEPH EDGAR.